(12) United States Patent
Saitoh et al.

(10) Patent No.: US 8,797,468 B2
(45) Date of Patent: Aug. 5, 2014

(54) LIQUID CRYSTAL SHUTTER GLASSES

(75) Inventors: Goroh Saitoh, Tokyo (JP); Masao Imai, Tokyo (JP); Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 431 days.

(21) Appl. No.: 12/733,966

(22) PCT Filed: Oct. 1, 2008

(86) PCT No.: PCT/JP2008/067786
§ 371 (c)(1),
(2), (4) Date: Apr. 15, 2010

(87) PCT Pub. No.: WO2009/044756
PCT Pub. Date: Apr. 9, 2009

(65) Prior Publication Data
US 2010/0201897 A1    Aug. 12, 2010

(30) Foreign Application Priority Data

Apr. 10, 2007    (JP) .................................. 2007-261155

(51) Int. Cl.
*G02F 1/1335*    (2006.01)
*G02B 27/22*    (2006.01)

(52) U.S. Cl.
USPC .................. 349/13; 349/15; 348/53; 351/49; 359/466

(58) Field of Classification Search
USPC ............ 349/13, 15; 351/49; 359/466; 348/53
See application file for complete search history.

(56) References Cited

U.S. PATENT DOCUMENTS

| | | | | |
|---|---|---|---|---|
| 4,828,380 A | * | 5/1989 | Cherian | 351/45 |
| 5,671,035 A | * | 9/1997 | Barnes | 351/45 |
| 6,278,501 B1 | * | 8/2001 | Lin | 349/13 |
| 6,388,797 B1 | * | 5/2002 | Lipton et al. | 359/277 |
| 7,068,241 B2 | | 6/2006 | Sato et al. | |
| 2002/0163600 A1 | * | 11/2002 | Divelbiss et al. | 349/15 |
| 2006/0126698 A1 | * | 6/2006 | Blum et al. | 372/101 |
| 2006/0193629 A1 | | 8/2006 | Ootsuka et al. | |

FOREIGN PATENT DOCUMENTS

| | | |
|---|---|---|
| JP | 57-188012 | 11/1982 |
| JP | 62-191819 | 8/1987 |
| JP | 63-60689 | 3/1988 |
| JP | 2-308214 | 12/1990 |
| JP | 06-043320 A | 2/1994 |
| JP | 6-324287 | 11/1994 |
| JP | 8-327949 | 12/1996 |
| JP | 08-327949 A | 12/1996 |

(Continued)

OTHER PUBLICATIONS

Chinese Office Action dated Jun. 30, 2011, with English translation.

(Continued)

*Primary Examiner* — Michael Caley
(74) *Attorney, Agent, or Firm* — McGinn IP Law Group, PLLC (57) ABSTRACT

A liquid crystal shutter glasses comprises a liquid crystal shutter placed within the view angle of the observer of a display apparatus wherein the liquid crystal shutter has an effective shutter region in which the transmission or shielding of incident light is controllable and a light attenuation region positioned outside the effective shutter region for attenuating incident light.

19 Claims, 10 Drawing Sheets

(56) References Cited

FOREIGN PATENT DOCUMENTS

| | | |
|---|---|---|
| JP | 2002-82307 | 3/2002 |
| JP | 2002-082307 A | 3/2002 |
| JP | 2002-116217 | 4/2002 |
| JP | 2004-280042 | 10/2004 |
| JP | 2005-335409 | 12/2005 |
| JP | 2005-335409 A | 12/2005 |
| JP | 2006-186768 | 7/2006 |

OTHER PUBLICATIONS

Notification of Reasons for Rejection, dated Aug. 7, 2012, with English translation.

* cited by examiner

LIQUID CRYSTAL SHUTTER GLASSES

TECHNICAL FIELD

The present invention relates to liquid crystal shutter glasses and more specifically to liquid crystal shutter glasses in which the transmission/shielding is controlled in sync with the display screen of a display unit observed by the observer.

BACKGROUND ART

Figure 13:
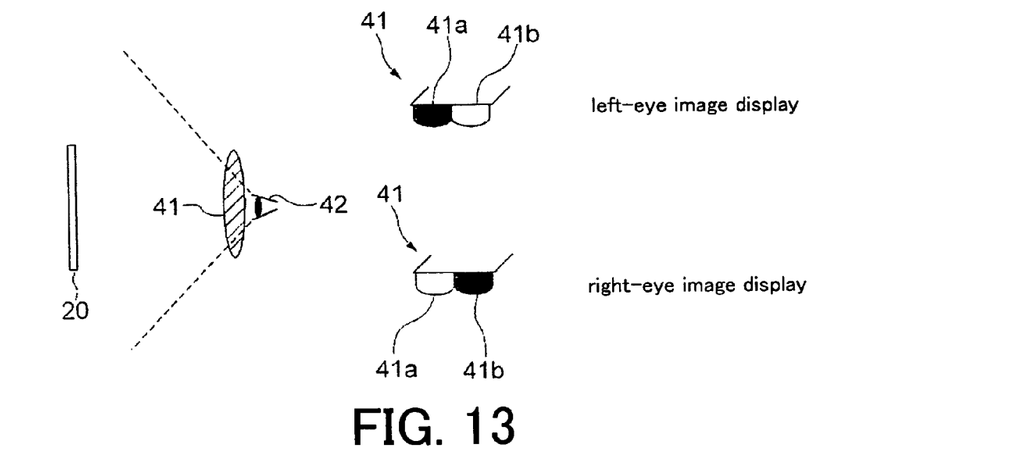
FIG. 13 is a schematic illustration showing a three-dimensional display system.

One of the display systems combining a field sequential display unit and liquid crystal shutter glasses is a three-dimensional display system. FIG. 13 shows an exemplary three-dimensional display system. For example, the three-dimensional system is comprised of a field sequential display unit (liquid crystal display apparatus) 20 and liquid crystal shutter glasses 41. The liquid crystal display apparatus 20 alternately displays right-eye images and left-eye images. The liquid crystal shutter glasses 41 have a right-eye liquid crystal shutter 41a and a left-eye liquid crystal shutter 41b. The right-eye liquid crystal shutter 41a and left-eye liquid crystal shutter 41b are switched between transmission and shielding in sync with the right-eye images and left-eye images displayed on the liquid crystal display apparatus 20. In this figure, the lens in white is in the transmission state and the lens in black is in the shielding state. The right-eye shutter and left-eye shutter are alternately switched to lead the right-eye image and left-eye image on the liquid crystal display apparatus 20 to the right eye and left eye of the observer 42, respectively. The right-eye image and left-eye image displayed on the liquid crystal display apparatus are images on which the parallax between the right and left eyes is reflected so that the observer 42 can view them as three-dimensional images.

Another display system combining a field sequential display unit and liquid crystal shutter glasses is a multiview display system (for example, Patent Literature 1). The multiview display system has the same configuration as the three-dimensional display system shown in FIG. 13. In a multiview system, the liquid crystal display apparatus 20 displays images directed to multiple observers in sequence. The liquid crystal shutter glasses 41 used by the multiple observers repeat transmission/shielding in sync with the corresponding display. This behavior is shown in FIG. 14.

Figure 14:
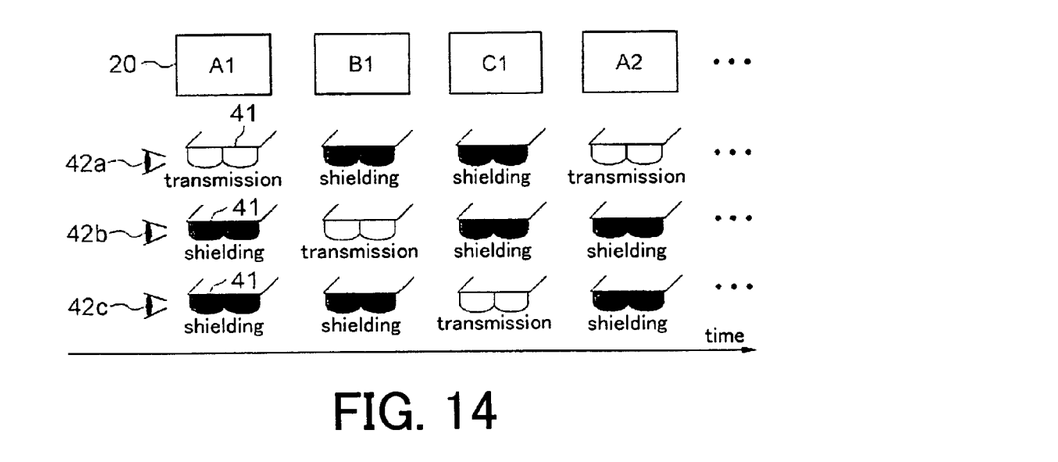
FIG. 14 is a schematic illustration showing the behavior in a multiview display system.

In the example shown in FIG. 14, the liquid crystal display apparatus 20 displays an image A1 to an observer 42a, an image B1 to an observer 42b, an image C1 to an observer 42c, an image A2 to the observer 42a, an image B2 to the observer 42b, an image C2 to the observer 42c, . . . in sequence. The liquid crystal shutter glasses 41 of the observer 42a is in the transmission state when the images A1, A2, . . . are displayed and in the shielding state when the images B1, B2, . . . , C1, C2, . . . are displayed. In this way, observer 42a can continuously observes the images A1, A2, . . . . For the other observers 42b and 42c, the transmission state is created when the corresponding images B1, B2, . . . or C1, C2, . . . are displayed and the shielding state is created when the other images are displayed. In this way, the multiple observers can view different displayed images.

Figure 15:
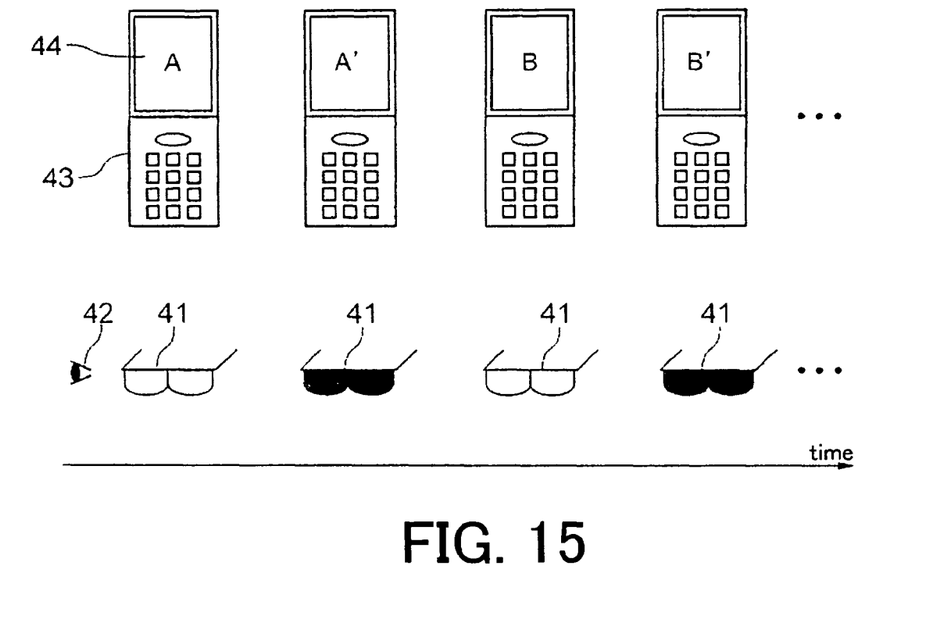
FIG. 15 is a schematic illustration showing the behavior in highly confidential display.

Furthermore, the display unit of a portable information terminal such as a laptop computer can be used as a field sequential display unit and combined with liquid crystal shutter glasses to realize a highly confidential portable information terminal that allows only the user of the liquid crystal shutter glasses to view the information. Such an example is shown in FIG. 15. The field sequential display unit 44 of a portable information terminal 43 alternately displays images and inverted images thereof such as an image A, an inverted image A' of the image A, an image B, an inverted image B' of the image B, . . . and displays multiple images A (A'), B (B'), . . . in sequence. In such a case, if the observer observes the display screen without wearing liquid crystal shutter glasses 41, the images A and B are achromatized with their inverted images. Observers without glasses cannot recognize images A and B. However, with the liquid crystal shutter glasses 41 being switched to the transmission state in sync with the display of the images A and B and to the shielding state in sync with their inverted images A' and B', observer 42 wearing the liquid crystal shutter glasses 41 can recognize images A and B. Therefore, only observer 42 using the liquid crystal shutter glasses 41 can recognize the display.

In the above described display systems using liquid crystal shutter glasses, the observer may sense flickering due to ambient light because the liquid crystal shutter glasses also transmit/shield the ambient light or light not from the display. Particularly, the observer may sense more flickering under lighting equipment repeating instantaneous blinking such as a fluorescent lamp because the transmission/shielding cycle of the liquid crystal shutter glasses and the lighting cycle of the lighting equipment do not match.

Patent Literature 2 and 3 describe techniques for reducing the flickering in the use of liquid crystal shutter glasses. A three-dimensional image recognition apparatus, described in FIG. 2 of Patent Literature 2, combines a CRT having a linear polarization filter on the display surface with liquid crystal shutter glasses comprising, from the CRT side, a liquid crystal sealing glass plate and a linear polarization filter. In this combination, the display light from the CRT is polarized light. Therefore, the liquid crystal sealing glass plate and linear polarization filter of the liquid crystal shutter glasses transmit or shield the display light. On the other hand, the ambient light (light from any source other than the CRT) is not polarized light and, therefore, is not shielded by the liquid crystal shutter glasses. Consequently, the transmission/shield switching is effective only within the view angle to the CRT display area, reducing the flickering due to ambient light. In Patent Literature 3, FIG. 1 describes a three-dimensional image display apparatus similar to the one in Patent Literature 2. Furthermore, in Patent Literature 3, FIG. 2 describes provision of a liquid crystal cell on the front surface of a color image receiving apparatus and use of polarization glasses as having the same effect as in Patent Literature 2 and Patent Literature 3, FIG. 1.

Patent Literature 4 describes a display system combining a special liquid crystal panel having a display screen visually unrecognizable to the naked eye with a visualizing means having a polarization filter for visualizing the screen of the special liquid crystal panel. One of the visualizing means is glasses having a polarization filter only on a part of the spectacle lens in order to prevent peek through the glasses (Patent Literature 4, FIG. 8). Similarly to Patent Literature 4, Patent Literature 5 to 8 describe glasses having spectacle lenses partly formed by a polarization filter, electronic shutter element, electronic shutter, or liquid crystal light modulation layer. In Patent Literature 5, the polarization glasses for viewing three-dimensional images have a transmission part for easy observation of things other than the displayed image. In Patent Literature 6, the electronic shutter element is embedded in the lens plastic of stereo glasses and the spectacle lens is partly formed by an electronic shutter for improved weather resistance of the electronic shutter element and combined use with vision corrective glasses. In Patent Literature 7, FIG. 1 describes a spectacle lens partly formed by an electronic shutter. In Patent Literature 8 describes a spectacle lens having a liquid crystal light modulation layer in the upper half to cut off strong light and brightness and to easily read characters in a close range.

The Patent Literature referred to in the above are as follows.

Patent Literature 1: Unexamined Japanese Patent Application KOKAI Publication No. 2006-186768 (pages 1 to 3);

Patent Literature 2: Unexamined Japanese Patent Application KOKAI Publication No. 2002-82307 (pages 1-2 and FIGS. 2, 4, and 5);

Patent Literature 3: Unexamined Japanese Patent Application KOKAI Publication No. S62-191819 (pages 1-3 and FIGS. 1 and 2);

Patent Literature 4: Unexamined Japanese Patent Application KOKAI Publication No. 2004-280042 (pages 1-2 and FIGS. 1A, 2A, and 8);

Patent Literature 5: Unexamined Japanese Patent Application KOKAI Publication No. H6-324287 (page 1 and FIG. 2);

Patent Literature 6: Unexamined Japanese Patent Application KOKAI Publication No. S57-188012 (pages 1-3 and FIG. 1);

Patent Literature 7: Unexamined Japanese Patent Application KOKAI Publication No. 2002-116217 (page 3 and FIG. 1); and Patent Literature 8: Unexamined Japanese Patent Application KOKAI Publication No. H2-308214 (pages 1-2 and FIG. 2).

DISCLOSURE OF INVENTION

The three-dimensional image recognition apparatuses, described in Patent Literature 2 and Patent Literature 3, FIG. 1, switch the transmission/shielding only within the view angle to the display area. Therefore, the display light from the display apparatus has to be polarized light; namely, the display light from the display apparatus is restricted. In display apparatuses using natural light such as CRT, plasma display, and organic EL display, a polarization filter is required on the display surface of the display apparatus. Therefore, when such display apparatuses display regular images, not three-dimensional or multiview images, for which no optical shutter or field sequential display is required, the polarization filter attenuates the display light, whereby the displayed image becomes dark.

In order for the observer to view excellent three-dimensional images on a display apparatus, the angle between the polarization plane of the polarization filter of the liquid crystal shutter glasses and the polarization plane of the polarization filter on the display surface of the display apparatus has to be maintained at a specific angle. This is because sufficient transmission/shielding contrast is not obtained if the angle deviates from the specific angle. However, it is difficult to maintain a specific angle between the polarization plane of the polarization filter of the display apparatus and the polarization plane of the liquid crystal shutter glasses because the observer does not always face the display apparatus squarely or the observer may lean his body or the glasses may be tilted. The three-dimensional image recognition apparatus described in Patent Literature 3, FIG. 2 has the same problem as those described in Patent Literature 2 and Patent Literature 3, FIG. 1.

The glasses described in Patent Literature 4 are polarization glasses with no shutter function. They have a polarization filter on a part of the spectacle lens in order to prevent peek through the glasses. They are irrelevant to the flickering due to ambient light the observer may sense. The glasses described in Patent Literature 5 use polarization spectacle lenses having a transmission part for easy viewing of things other than the displayed image. In Patent Literature 8, the upper half of the lens consists of a liquid crystal light modulation layer for the same reason. Both glasses are intended for easy viewing of the surroundings, not the displayed image, and irrelevant to the flickering due to ambient light the observer may sense like the glasses in Patent Literature 4. In the glasses described in Patent Literature 6, an electronic shutter element is embedded in the lens for improved weather resistance of the electronic shutter element and combined use with vision correction glasses. These glasses are irrelevant to the flickering due to ambient light the observer may sense. Patent Literature 7 has no description regarding the flickering due to ambient light the observer may sense.

Figure 16A:
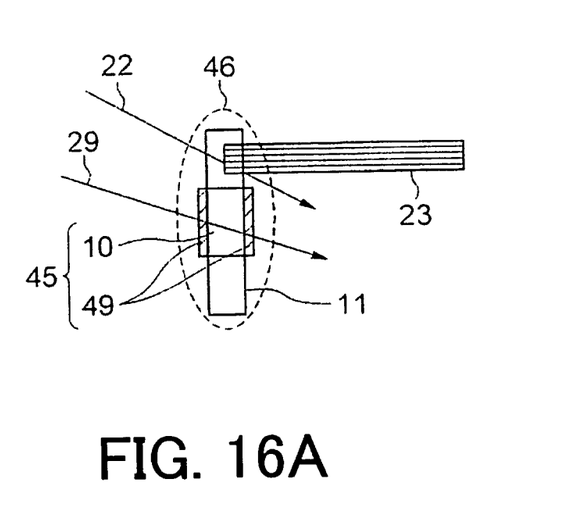
FIG. 16A is a side view of liquid crystal shutter glasses of the related technology and FIG. 16B is a schematic illustration showing the relationship among the observer, liquid crystal shutter glasses, and display light from a field sequential display unit.
Figure 16B:
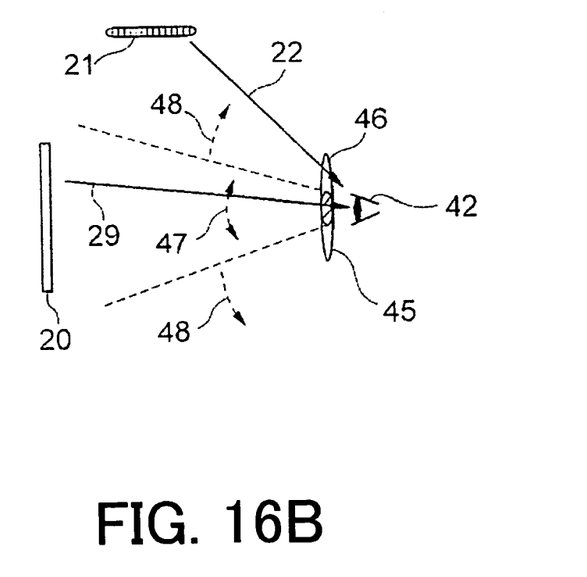

The display light from a display apparatus can be transmitted/shielded as in Patent Documents 2 and 3 by combining liquid crystal shutter glasses having spectacle lenses partly formed by a liquid crystal shutter as in the glasses described in Patent Literature 4 to 8 with a field sequential display unit. In such a case, a three-dimensional image recognition apparatus in which the transmission/shielding of ambient light is reduced can be obtained. FIG. 16A is a side view of liquid crystal shutter glasses. FIG. 16B shows the relationship among the observer, liquid crystal shutter glasses, and display light from a field sequential display unit. A lens 11 is supported by a spectacle frame 23. A liquid crystal shutter part 45 smaller than the lens in diameter is formed in the lens 11. The liquid crystal shutter 45 consists of a liquid crystal cell 10 and a pair of polarization layers 49 holding the liquid crystal cell 10 in-between. In this structure, the lens 11 and liquid crystal shutter 45 constitute the effective lens region 46 of the glasses.

As shown in FIG. 16B, the observer 42 observes a field sequential display unit 20 within a central view field 47. The transmission/shielding of the liquid crystal shutter 45 can be controlled in sync with the display screen of the field sequential display unit 20 so that the display light 29 from the field sequential display unit 20 is transmitted/shielded. On the other hand, ambient light 22 from a peripheral view field 48 such as light from a fluorescent lamp 21 reaches the observer 42 without passing through the area of the effective lens region 46 where the liquid crystal shutter 45 is formed. Therefore, the ambient light 22 enters the eyes of the observer 42 regardless of the transmission/shielding of the liquid crystal shutter part 45, thereby reducing flickering. However, the liquid crystal shutter glasses having the effective lens region 46 partly formed by the liquid crystal shutter part 45 allows the ambient light 22 to enter the eyes of the observer 22 as it is. Here, a new problem is that the pupils of the observer 42 contract and the observer 42 feels that the display on the field sequential display unit is dark.

The purpose of the present invention is to provide liquid crystal shutter glasses that prevent the observer from sensing any flickering and allow the observer to feel that the display on the field sequential display unit is bright.

The present invention provides liquid crystal shutter glasses comprising a liquid crystal shutter placed within the view angle of the observer of a display apparatus characterized in that the liquid crystal shutter has an effective shutter region in which the transmission or shielding of incident light is controllable and a light attenuation region positioned outside the effective shutter region for attenuating incident light.

The liquid crystal shutter glasses of the present invention has the effect that the observer of a display apparatus sense no flickering and feels that the display on the field sequential display unit is bright when he/she observes the display apparatus with the liquid crystal shutter glasses.

The above and other purposes, characteristics, and benefits of the present invention will be apparent from the explanation below with reference to the drawings.

BEST MODE FOR CARRYING OUT THE INVENTION

Figure 1:
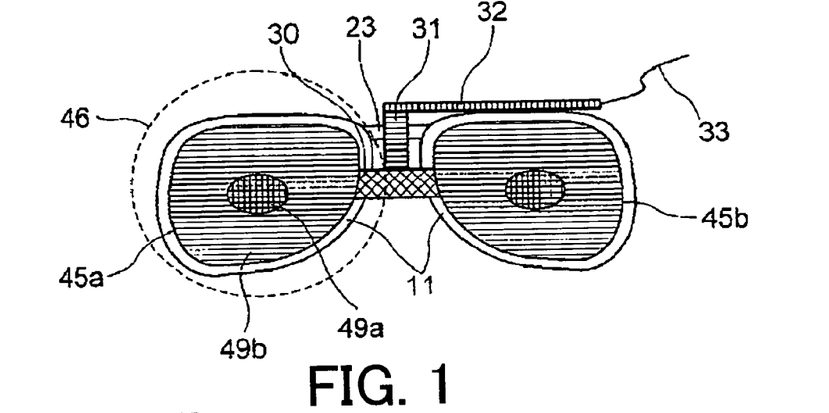
FIG. 1 is a front view of the liquid crystal shutter glasses according to an embodiment of the present invention.

Embodiments of the present invention will be described in detail hereafter with reference to the drawings. For easy understanding, the same components are referred to by the same reference numbers throughout the figures. FIG. 1 is a front view of the liquid crystal shutter glasses according to an embodiment of the present invention when it is attached to ordinary glasses. The liquid crystal shutter glasses have liquid crystal shutters 45 including a right-eye liquid crystal shutter 45*a* and a left-eye liquid crystal shutter 45*b*, a signal receiver 30, and a fixture (support) 31. The liquid crystal shutter glasses have the liquid crystal shutters 45*a* and 45*b* within the view angle (effective lens region) 46 of the observer 42 when he/she observes through spectacle lenses 11.

The liquid crystal shutters 45*a* and 45*b* each have an effective shutter region in which the transmission or shielding of incident light is controllable and a light attenuation region positioned outside the effective shutter region for attenuating incident light. With the liquid crystal shutters having this structure, the liquid crystal shutter glasses of this embodiment prevent the observer from sensing any flickering and allow the observer to feel that the display on the field sequential display unit is bright when he/she observes a display apparatus with the liquid crystal shutter glasses. Details will be described hereafter.

When using the liquid crystal shutters 45*a* and 45*b*, they are attached to a spectacle frame 23 with the fixture 31 so as to cover the spectacle lenses 11. The glasses to which the liquid crystal shutter glasses are attached are ordinary glasses such as vision correction glasses. The spectacle glasses 11 can be vision correction lenses or plain glasses. The signal receiver 30 receives synchronization signals from a field sequential display unit used together with the liquid crystal shutter glasses. An infrared or Bluetooth system can be used for communication between the liquid crystal shutter glasses and field sequential display unit. The signal receiver 30 and liquid crystal shutters 45*a* and 45*b* are driven by an external circuit and power source (not shown) via a wire 33. The wire 33 is housed in a wire cover 32. Although the signal receiver 30 is placed in the middle of the right and left liquid crystal shutters 45*a* and 45*b* in FIG. 1, it can be placed at the end of the liquid crystal shutter 45*a* and/or 45*b*. The fixture 31 houses the signal receiver 30 and the wire 33 for the liquid crystal shutters 45*a* and 45*b*. The fixture 31 also serves to adjust the position of the liquid crystal shutters 45*a* and 45*b* so that they cover the lenses 11 (the eyes of the observer) when attached to glasses.

Figure 2:
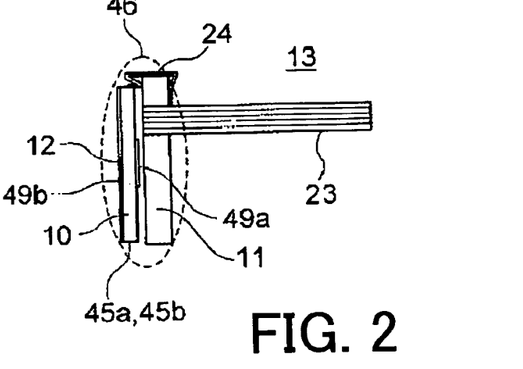
FIG. 2 is a side view of the liquid crystal shutter glasses.

FIG. 2 is a side view of the liquid crystal shutter glasses attached to glasses. In this embodiment, a fitting 24 constituting the fixture 31 (FIG. 1) is used to attach the liquid crystal shutter glasses to the spectacle frame 23 of glasses 13. In this usage, the spectacle lens 11 and the liquid crystal shutter 45 attached to cover the lens 11 constitute the effective lens region 46 of the glasses. The liquid crystal shutter 45 constitutes a detachable liquid crystal shutter 12. The glasses 13 used with the liquid crystal shutter glasses can be the observer's own glasses.

Figure 3:
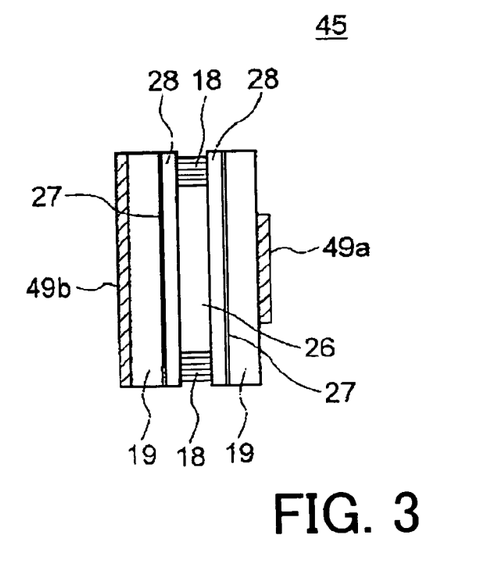
FIG. 3 is a cross-sectional view of the liquid crystal shutter glasses.

FIG. 3 shows a partial cross-sectional view of the liquid crystal shutter part 45. The liquid crystal shutter 45 has a liquid crystal cell 10 and a pair of polarization layers 49*a* and 49*b* holding the liquid crystal cell 10 in-between. The liquid crystal cell 10 has a pair of transparent substrates 19 and a liquid crystal layer 26 sealed between the pair of transparent substrates 19. The liquid crystal layer 26 can be a liquid crystal layer consisting of a TN or VA nematic liquid crystal material or SSFCL smectic liquid crystal material. An alignment film 28 formed by rubbing in a specific direction and a transparent electrode 27 for driving the liquid crystal layer 26 are formed on each of the pair of transparent substrates 19.

The liquid crystal layer 26 is held between the pair of transparent substrates 19 by a sealing member 18. It is preferable that the sealing member 18 and transparent substrates 19 have nearly equal refractive indices. In this way, the sealing member for the liquid crystal cell 10 is nearly invisible from outside. Alternatively, it is also preferable for making the sealing member 18 nearly invisible to cover the sealing member for the liquid crystal cell 10 with at least one of the polarization layers 49 of the liquid crystal shutter.

The polarization layers 49*a* and 49*b* transmit, for example, linearly polarized light in the directions of predetermined light transmission axes among the incident light. The light transmission axes of the polarization layers 49a and 49b are orthogonal to each other. The liquid crystal layer 26 consists of, for example, a twisted nematic type liquid crystal material. The liquid crystal layer 26 has a twist angle of 90°. The liquid crystal orientation of the liquid crystal layer 26 close to the polarization layer 49a is nearly parallel to the light transmission axis of the polarization layer 49a. The liquid crystal orientation of the liquid crystal layer 26 close to the polarization layer 49b is nearly parallel to the light transmission axis of the polarization layer 49b. These initial liquid crystal orientations are determined by the rubbing directions of the alignment films 28.

When the voltage applied between the transparent electrodes 27 of the liquid crystal cell 10 is 0 V (no application of voltage), the light that is transmitted through the polarization layer 49b is subject to change in polarization direction by 90° while it passes through the liquid crystal layer 26 and is transmitted through the polarization layer 49a. This event is termed "the transmission state." On the other hand, when a voltage is applied between the transparent electrodes 27 to raise the liquid crystal molecules in the direction orthogonal to the substrates, the light that is transmitted through the polarization layer 49b passes through the liquid crystal layer 26 with no change in polarization direction; therefore, it cannot be transmitted through the polarization layer 49a. This event is termed "the shielding state." It is preferable that the liquid crystal shutter part 45 is in the transmission state upon no application of voltage so that the observer's view is not obstructed while no signals are applied. In other words, "normally white" is preferable.

One of the pair of polarization layers 49a and 49b of the liquid crystal shutter 45 is smaller than the other. In FIG. 3, the polarization layer 49a closer to the observer is smaller than the polarization layer 49b away from the observer or closer to the field sequential display unit. In this structure, one polarization layer 49a defines the effective shutter region in which the transmission or shielding of incident light is controllable and the other polarization layer 49b defines the light attenuation region positioned outside the effective shutter region for attenuating incident light.

The polarization layer 49b is formed, for example, over the entire surface of the liquid crystal cell 10. Preferably, as shown in FIG. 1, it is formed to nearly entirely cover the lens 11. The polarization layer 49a is formed in a smaller size, for example in a size of approximately 1.5 to 2.0 mm in diameter. It is preferable that the polarization layer 49a is positioned nearly at the center of the lens, namely nearly at the eyes of the observer. Only the light that is transmitted through both of the two polarization layers 49a and 49b is subject to the transmission/shielding control by the liquid crystal shutter part 45. The region in which the transmission/shielding is repeated, namely the effective shutter region functioning as a shutter within the view field of the observer is determined by the size of the smaller polarization layer 49a of the pair of polarization layers.

Figure 4A:
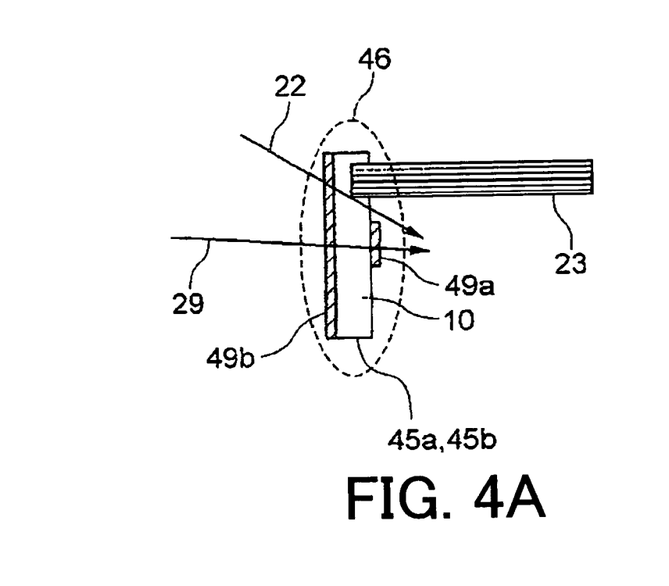
FIG. 4A is a side view showing the liquid crystal shutter and light entering the liquid crystal shutter and FIG. 4B is a schematic illustration showing the positional relationship between the liquid crystal shutter glasses and field sequential display unit.
Figure 4B:
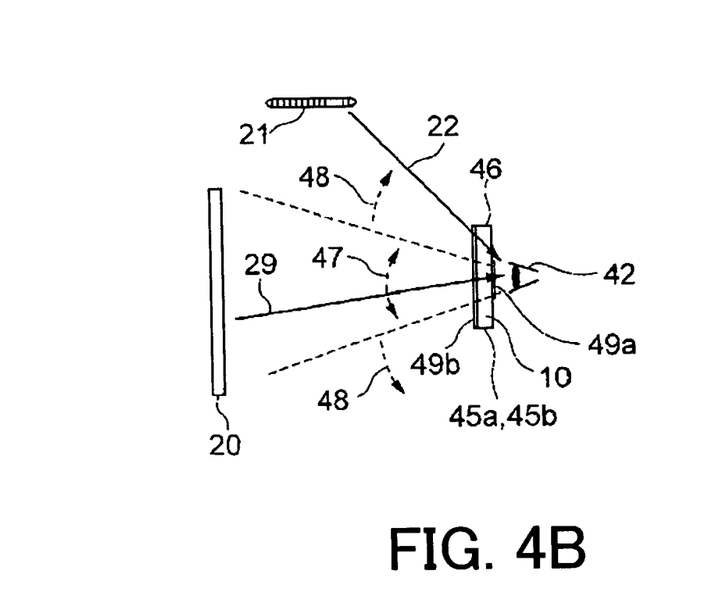

FIG. 4A shows the liquid crystal shutter 45 and light entering the liquid crystal shutter 45. FIG. 4B shows the positional relationship between the liquid crystal shutter glasses and field sequential display unit. Here, the liquid crystal shutter 45 is directly attached to the spectral frame 23 in FIGS. 4A and 4B although the spectral lens 11 and liquid crystal shutter 45 are provided as separate pieces in FIGS. 1 and 2. In FIG. 4A, the liquid crystal shutter 45 defines the effective lens region 46 of the glasses. Such liquid crystal shutter glasses in which the liquid crystal shutter 45 defines the effective lens region 46 are preferable for observers who do not need vision correction.

In FIG. 4B, the central view field 47 of the view field in which the observer makes observation is the region in which the liquid crystal shutter 45 repeats the transmission/shielding. The observer 42 observes display light 29 from the field sequential display unit 20 in the central view field 47. The liquid crystal shutter 45 repeats the transmission/shielding in response to synchronization signals in which the signal receiver 30 (FIG. 1) receives from the field sequential display unit 20. The observer 42 observes the displayed image on the field sequential display unit 20 through the liquid crystal shutter glasses that repeat the transmission/shielding in sync with the display on the field sequential display unit 20, whereby the observer 42 can observe three-dimensional display images or multiview display images. On the other hand, light (ambient light) 22 from the peripheral view field 48 of the view field of the observer 42 is transmitted through only the larger polarization layer 49b of the pair of polarization layers 49 and reaches the observer 42 without being shielded by the liquid crystal shutter 45. Consequently, the liquid crystal shutter 45 does not serve as a shutter for the ambient light 22 from the peripheral view field 48. It simply attenuates the ambient light 22.

Figure 5A:
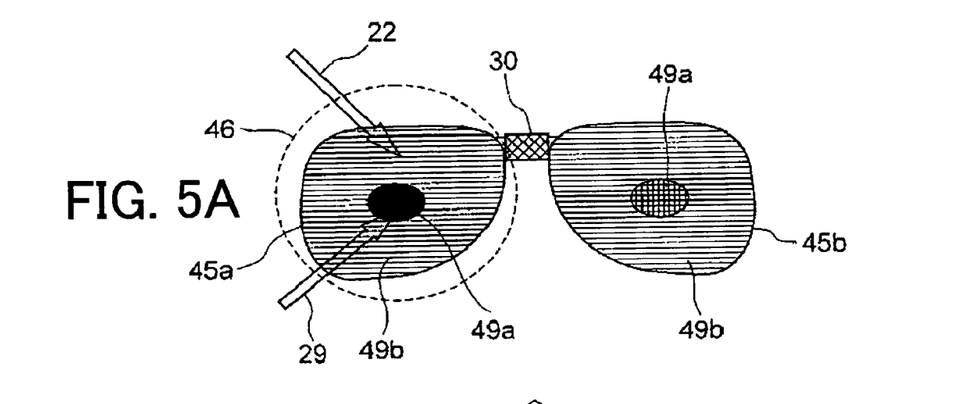
FIGS. 5A and 5B are front views showing the behavior of the liquid crystal shutter glasses in a three-dimensional display system by way of example.
Figure 5B:
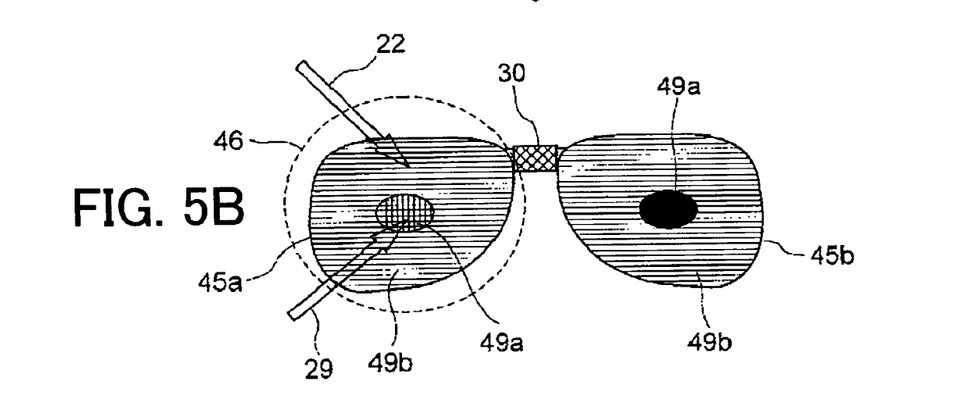

FIGS. 5A and 5B show the behavior of the liquid crystal shutter glasses in a three-dimensional display system by way of example. In a three-dimensional display system, the field sequential display unit 20 alternately displays right-eye images and left-eye images. The liquid crystal shutter glasses control the left-eye liquid crystal shutter 45b for transmission and the right-eye liquid crystal shutter 45a for shielding when left-eye images are displayed (FIG. 5A). Here, the shielded portion of the right eye of the observer corresponds to the polarization layer 49a. Therefore, the display light 29 from the field sequential display unit 20 is shielded, but the ambient light 22 from a fluorescent lamp 21 nearby (FIG. 4B) is not shielded and reaches the right eye of the observer via the polarization layer 49b. On the other hand, the liquid crystal shutter glasses control the right-eye liquid crystal shutter 45a for transmission and the left-eye liquid crystal shutter 45b for shielding when right-eye images are displayed (FIG. 5B). Here, the shielded portion of the left eye of the observer corresponds to the polarization layer 49a in the left-eye liquid crystal shutter 45b.

Figure 6A:
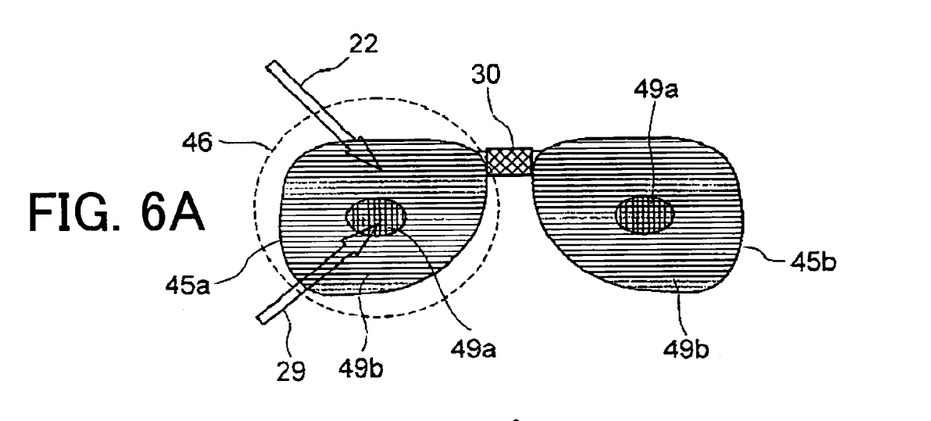
FIGS. 6A and 6B are front views showing the behavior of the liquid crystal shutter glasses in a multiview display system by way of example.
Figure 6B:
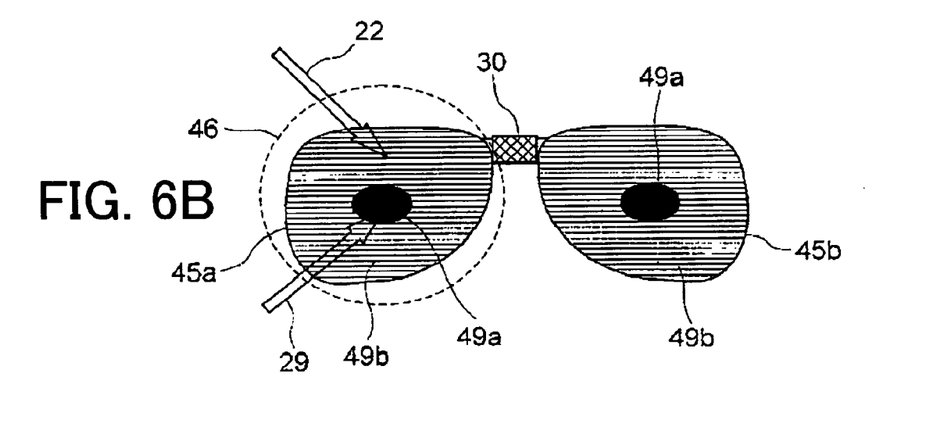

FIGS. 6A and 6B show the behavior of the liquid crystal shutter glasses in a multiview display system by way of example. In a three-dimensional display system, the liquid crystal shutter 45 repeats alternate right and left transmission/shielding. On the other hand, in a multiview display system, the liquid crystal shutter 45 repeats simultaneous right and left transmission (FIG. 6A) and simultaneous right and left shielding (FIG. 6B). Also in this case, the display light 29 from the field sequential display unit 20 is repeatedly transmitted/shielded and the ambient light 22 reaches the observer via the polarization layer 49b without being shielded by the liquid crystal shutter 45 in the same manner as in a three-dimensional display system.

Figure 7A:
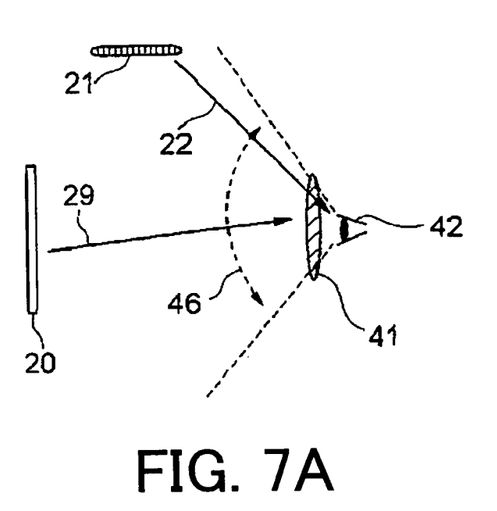
FIGS. 7A and 7B are schematic illustrations showing observation of a field sequential display unit using liquid crystal shutter glasses of the related technology.
Figure 7B:
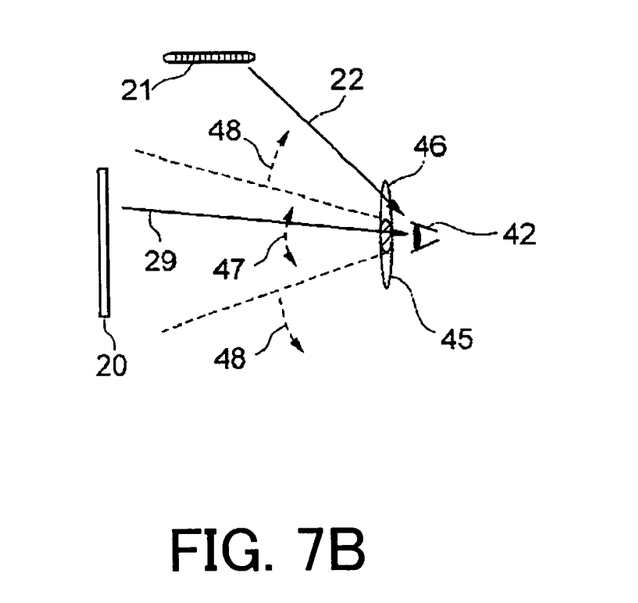

FIGS. 7A and 7B show observation of a field sequential display unit using liquid crystal shutter glasses of the related technology. The liquid crystal shutter glasses of the related technology shown in FIG. 7A have a liquid crystal shutter formed over the entire effective lens region of the glasses. Therefore, when the liquid crystal shutter repeats the transmission/shielding, not only the light from the field sequential display unit 20 but also the ambient light 22 from the fluorescent lamp 22 and other ambient light are repeatedly transmitted/shielded, whereby the observer 42 senses flickering. On the other hand, the liquid crystal shutter glasses of the related technology shown in FIG. 7B have a liquid crystal shutter 45 smaller than the effective lens region 46 and repeats the transmission/shielding in the central view field 47. In this way, flickering can be reduced. However, in this structure, the ambient light 22 from the peripheral view field 48 enters the eyes of the observer 42 as it is. Then, the pupils of the observer 42 contract and the observer feels that the display on the liquid crystal display apparatus 20 is dark.

On the other hand, in this embodiment, one polarization layer 49a of the pair of polarization layers 49 is smaller than the other polarization layer 49b. The liquid crystal shutter 45 repeats the transmission/shielding in the view field 47 that is defined by the smaller polarization layer 49a of the pair of polarization layers 49 and where the display light 29 enters while the transmission/shielding has no effect on ambient light, particularly the ambient light 22 from the fluorescent lamp 21. Therefore, the flickering the observer 42 may sense can be reduced. The ambient light 22 coming from the peripheral view field 48 and entering the eyes of the observer 42 (light from the fluorescent lamp 21 and other ambient light) is attenuated by the larger polarization layer 49b of the pair of polarization layers 49. Consequently, the light amount of the ambient light 22 entering the eyes of the observer 42 is reduced compared with the liquid crystal shutter glasses of the related technology shown in FIG. 7B, whereby the pupils of the observer 42 do not dilate. Hence, in this embodiment, the flicking can be reduced and the observer can feel that the display on the field sequential display unit 20 is bright.

In this embodiment, a pair of polarization layers 49 necessary for the liquid crystal shutter is provided to the liquid crystal shutter itself. Therefore, even if the observer 42 tilts his/her head while observing the field sequential display unit 20, the polarization planes of the pair of polarization layers 49 are maintained at a predetermined angle. Consequently, the transmission/shielding contrast can be improved and excellent display can be achieved compared with the case in which the polarization layer is provided on the display surface of a field sequential display unit. Furthermore, the display light 29 from the field sequential display unit 20 does not need to be polarized light. Whether the display light from the field sequential display unit 20 is natural light or polarized light, the flickering can be controlled. Furthermore, when the field sequential display unit 20 is a display unit using natural light as the display light, such as CRT, plasma display, and organic EL display, and is used for displaying regular images that require no liquid crystal shutter or field sequential display, the display can be brighter compared with those having the polarization layer on the display surface.

Figure 8:
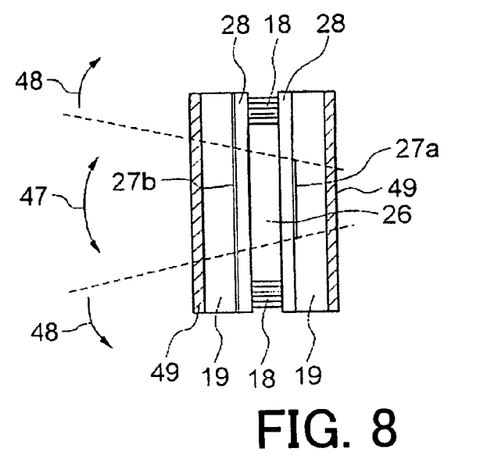
FIG. 8 is a cross-sectional view of the liquid crystal shutter of the liquid crystal shutter glasses according to a modified embodiment of the present invention.

As described above, in this embodiment, one of the pair of polarization layers 49 is smaller than the other. With this structure, the liquid crystal shutter 45 serves as a shutter for light from the central view field while it does not serve as a shutter for light from the peripheral view field. Alternatively, the equal feature can be realized by narrowing the area in which the liquid crystal shutter is driven. FIG. 8 is a cross-sectional view of a liquid crystal shutter having a smaller liquid crystal drive area. In FIG. 8, one (the transparent electrode 27a closer to the observer) of the transparent electrodes 27 facing each other with the liquid crystal layer 26 in-between is smaller than the other (the transparent electrode 27b closer to the field sequential display unit). The pair of polarization layers 49 is equal in size. With this structure, a liquid crystal shutter in which the transparent electrode 27b defines the light attenuation region and the transparent electrode 27a defines the effective shutter region is obtained.

Figure 9:
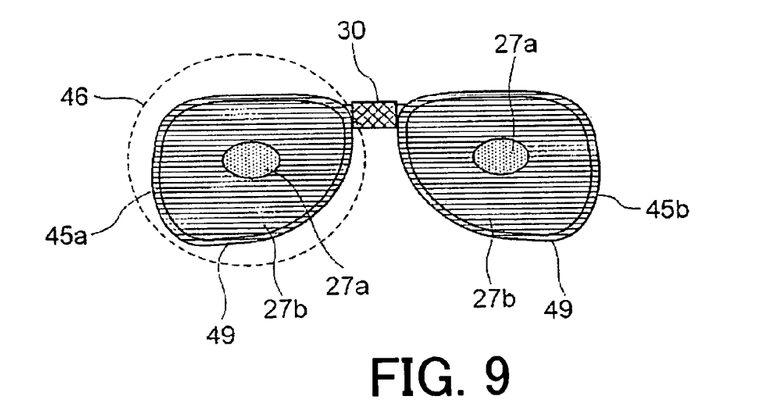
FIG. 9 is a front view of the liquid crystal shutter glasses of the modified embodiment.

FIG. 9 is a front view of liquid crystal shutter glasses with a liquid crystal shutter having the structure shown in FIG. 8. The larger transparent electrode (the transparent electrode 27b closer to the field sequential display unit in FIG. 8) of the pair of transparent electrodes 27 is equal in size to the effective lens region 46 of the glasses. On the other hand, the smaller transparent electrode (the transparent electrode 27a closer to the observer in FIG. 8) is formed around the center of the lens in a size of, for example, approximately 1.5 to 2.0 mm in diameter. The signal receiver 30 is the same as the signal receiver 30 in FIG. 1.

In the liquid crystal shutter shown in FIG. 8, the liquid crystal in the area of the liquid crystal layer 26 where the transparent electrodes 27a and 27b overlap each other is driven. For example, if the liquid crystal shutter is normally white, it is in the transmission state upon no application of voltage and in the shielding state upon application of voltage. Meanwhile, the liquid crystal in the area where the transparent electrodes 27a and 27b do not overlap each other is not driven even if any voltage is applied to the transparent electrodes 27a and 27b. Therefore, the area is always in the transmission state and does not serve as a shutter. Consequently, in the structure shown in FIG. 8, the view field functioning as a shutter repeating the transmission/shielding is determined by the size of the smaller transparent electrode 27a of the pair of transparent electrodes 27.

In FIG. 8, the observer observes the field sequential display unit in the central view field 47 that is defined by the transparent electrode 27a and in which the transmission/shielding is repeated. Therefore, as in the above described case, the observer can view the display on the field sequential display unit without sensing any flickering due to ambient light. Also in the structure shown in FIG. 8, the light entering the eyes of the observer from the peripheral view field 48 is the light transmitted through the polarization layer 49. Therefore, the observer can feel that the display on the field sequential display unit is bright. Furthermore, since the pair of polarization layers 49 maintains a specific positional relationship, excellent displayed images having sufficient transmission/shielding contrast can be obtained. In other words, the same effect as when one of the pair of polarization layers 49 is smaller than the other is obtained when one of the transparent electrodes 27 is smaller than the other.

Figures 10A, 10B:
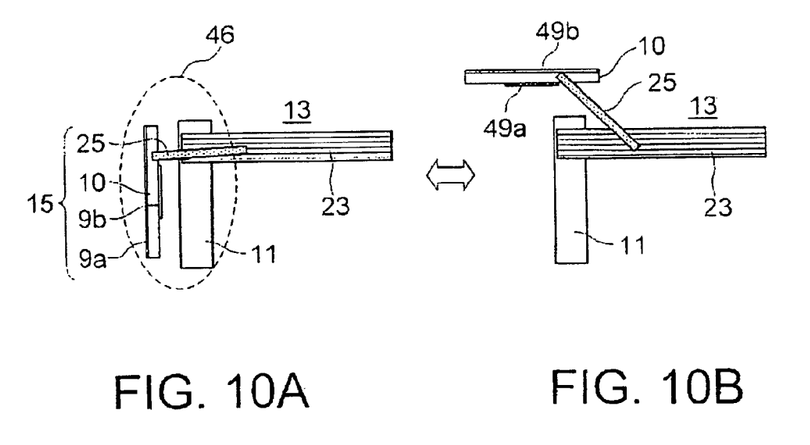
FIGS. 10A and 10B are side views of flip-up liquid crystal shutter glasses.

In the above described embodiments, the liquid crystal shutter is attached to glasses (FIG. 2) or the liquid crystal shutter constitutes a lens part of glasses (FIG. 4A). Other various structures can be employed. FIGS. 10A and 10B show a flip-up liquid crystal shutter. In this embodiment, the liquid crystal shutter 45 is attached to the frame 23 of glasses 13 via a flip-up mechanism 25, whereby the liquid crystal shutter 45 is used as a flip-up liquid crystal shutter 15. The flip-up liquid crystal shutter 15 is placed to cover the lens 11 for observing three-dimensional display images or multiview images on a field sequential display unit (for use of the liquid crystal shutter) (FIG. 10A). On the other hand, the flip-up liquid crystal shutter 15 is flipped up for observing regular images on the field sequential display unit or while not observing the field sequential display unit (for nonuse of the liquid crystal shutter) (FIG. 10B).

Figure 11A:
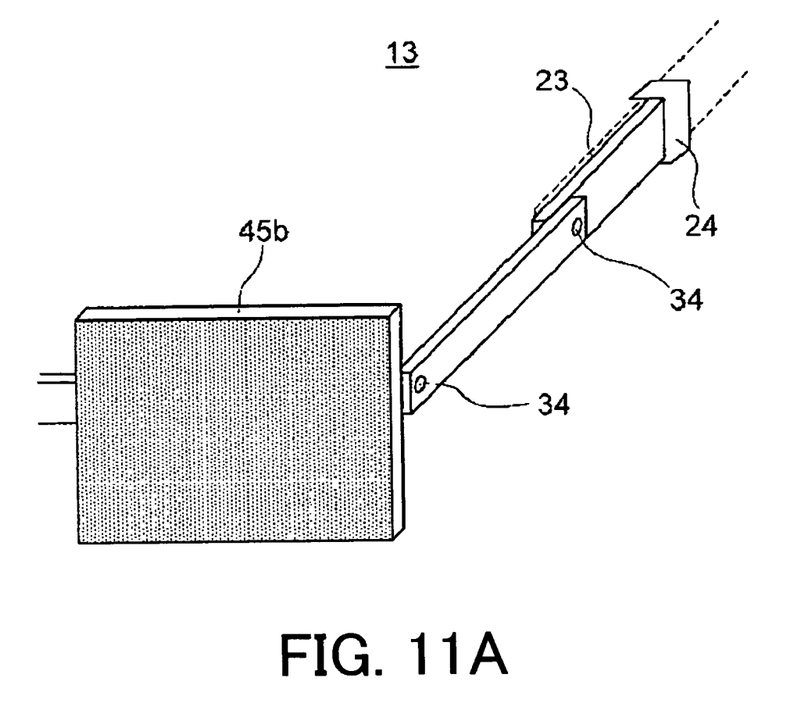
FIGS. 11A and 11B are enlarged, perspective views of the flip-up mechanism.
Figure 11B:
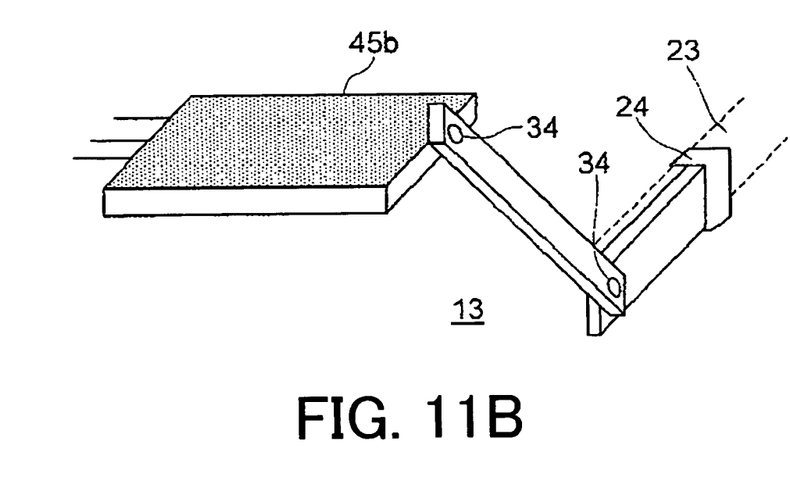

FIGS. 11A and 11B are enlarged views of the flip-up liquid crystal shutter 15. These figures are enlarged views of and around the left-eye liquid crystal shutter 45b of the flip-up liquid crystal shutter 15. In this structure, the liquid crystal shutter is attached to a spectacle frame in a rotatable manner between the use position at which the liquid crystal shutter is placed within the view field of the observer and the nonuse position at which the liquid crystal shutter is placed outside the view field of the observer. More specifically, the liquid crystal shutter 45b is attached to the frame 23 of the glasses 13 by a fitting 24 having two rotation mechanisms 34 (the flip-up mechanism 25 in FIG. 10). The fitting 24 is extended straight from the frame 23 so that the liquid crystal shutter 45 covers the lens 11 for observing three-dimensional images or multi-view images on a field sequential display unit (FIG. 11A). When the liquid crystal shutter 45*b* is unnecessary, the rotation mechanisms 34 are rotated to flip up the liquid crystal shutter 45*b* (FIG. 11B). In this state, the liquid crystal shutter glasses to which the liquid crystal shutter is attached can be used as regular glasses. The liquid crystal shutter is not necessarily supported by the spectral frame. The liquid crystal shutter can be used by itself as shown in the figure.

Figure 12A:
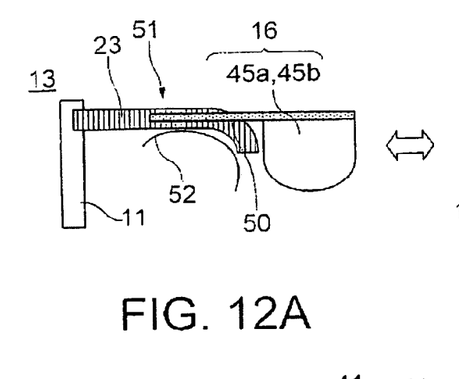
FIGS. 12A and 12B are side and perspective views of folding liquid crystal shutter glasses.
Figure 12B:
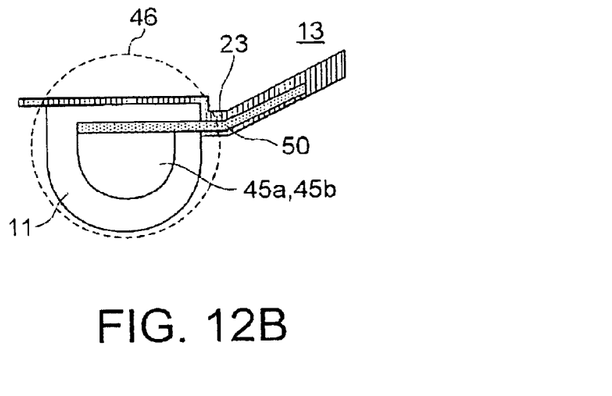

FIGS. 12A and 12B show a folding frame supporting the liquid crystal shutter. In this embodiment, the liquid crystal shutter part 45 is attached to the frame 23 of the glasses 13 via a folding mechanism having a bend 50 and a hinge 51, whereby the liquid crystal shutter part 45 is used as a folding liquid crystal shutter 16. When the liquid crystal shutter is not used, the folding liquid crystal shutter 16 is placed behind the ear 52 (FIG. 12A). The folding liquid crystal shutter 16 is moved to cover the lens 11 by using the folding mechanism when using the liquid crystal shutter (FIG. 12B). The liquid crystal shutter is not necessarily supported by the spectral frame. The liquid crystal shutter can be used by itself without any spectacle lens.

When the liquid crystal shutter 45 is provided separately from the glasses, the liquid crystal shutter glasses apparently seem like regular glasses when the liquid crystal shutter is not used unless the liquid crystal shutter 12 (FIG. 2), 15 (FIG. 10A), or 16 (FIG. 12) is placed in front of the lens 11. This is advantageous because it does not draw much attention from people around. When the liquid crystal shutter 45 is a flip-up type (FIG. 10A) or a folding type (FIG. 12A), the liquid crystal shutter 45 can easily and quickly be placed in front of the lens 11 when it is needed.

The circuit and power source for driving liquid crystal shutter glasses can be integrated with the liquid crystal shutter glasses. The signal receiver 30 can be provided separately from the liquid crystal shutter glasses along with the circuit and power source. The polarization layers 49 constituting the liquid crystal shutter 45 can be linear polarization layers, circular polarization layers, or circular polarization plus quarter wavelength plates depending on the liquid crystal drive system for the liquid crystal layer of the liquid crystal cell 10. Furthermore, the liquid crystal shutter 45 can have a view angle compensation film (phase difference layer).

The present invention is specified and described using exemplary embodiments. The present invention is not restricted to these embodiments and their modifications. As apparent to a person of ordinary skill in the field, various modifications can be made to the present invention without departing from the spirit and scope of the present invention defined in the attached claims.

The present invention claims the benefit of Japanese Patent Application No. 2007-261155, filed on Oct. 4, 2007, the entire disclosure of which is incorporated by reference herein.

The invention claimed is:

1. Liquid crystal shutter glasses, comprising:
   a liquid crystal shutter placed within a view angle of an observer of a display apparatus,
   wherein said liquid crystal shutter comprises:
      an effective shutter region in which a transmission or shielding of incident light is controllable;
      a light attenuation region for diminishing and transmitting incident light that is positioned outside the effective shutter region for attenuating incident light; and
      a liquid crystal cell including a liquid crystal layer and first and second transparent electrodes holding the liquid crystal layer in-between, and first and second polarization layers holding the liquid crystal cell in-between, and
   wherein one of said first and second transparent electrodes is smaller than another one of said first and second transparent electrodes and defines said effective shutter region.

2. The liquid crystal shutter glasses according to claim 1, wherein said liquid crystal shutter comprises first and second polarization layers holding the liquid crystal cell in-between, said first polarization layer defines said effective shutter region, and said second polarization layer is larger than said first polarization layer and defines said light attenuation region.

3. The liquid crystal shutter glasses according to claim 2, wherein at least one of said first and second polarization layers covers a sealing member for said liquid crystal cell.

4. The liquid crystal shutter glasses according to claim 2, further comprising a spectacle lens that is formed as a separate piece from said liquid crystal shutter.

5. The liquid crystal shutter glasses according to claim 1, further comprising a spectacle lens that is formed as a separate piece from said liquid crystal shutter.

6. The liquid crystal shutter glasses according to claim 2, wherein said liquid crystal shutter is supported by a spectral lens frame.

7. The liquid crystal shutter glasses according to claim 2, wherein said liquid crystal shutter is attached to a frame and is rotatable between a use position at which said liquid crystal shutter is placed within the view angle of the observer and a nonuse position at which said liquid crystal shutter is placed outside the view angle of the observer.

8. The liquid crystal shutter glasses according to claim 2, wherein said liquid crystal shutter is supported by a foldable frame.

9. The liquid crystal shutter glasses according to claim 1, further comprising a spectacle lens that is formed as a separate piece from said liquid crystal shutter, and said liquid crystal shutter is arranged in an outward side of said spectacle lens.

10. The liquid crystal shutter glasses according to claim 9, wherein said liquid crystal shutter is supported by a spectral lens frame.

11. The liquid crystal shutter glasses according to claim 9, wherein said liquid crystal shutter is attached to a frame and is rotatable between a use position at which said liquid crystal shutter is placed within the view angle of the observer and a nonuse position at which said liquid crystal shutter is placed outside the view angle of the observer.

12. The liquid crystal shutter glasses according to claim 9, wherein said liquid crystal shutter is supported by a foldable frame.

13. The liquid crystal shutter glasses according to claim 1, wherein said liquid crystal shutter is supported by a spectral lens frame.

14. The liquid crystal shutter glasses according to claim 1, wherein said liquid crystal shutter is attached to a frame and is rotatable between a use position at which said liquid crystal shutter is placed within the view angle of the observer and a nonuse position at which said liquid crystal shutter is placed outside the view angle of the observer.

15. The liquid crystal shutter glasses according to claim 1, wherein said liquid crystal shutter is supported by a foldable frame comprising a bend and a hinge.

16. The liquid crystal shutter glasses according to claim 1, wherein a sealing member for said liquid crystal cell and a substrate constituting said liquid crystal cell have nearly equal refractive indices.

17. The liquid crystal shutter glasses according to claim 1, wherein said liquid crystal shutter is supported by a foldable frame.

18. The liquid crystal shutter glasses according to claim 1, wherein the light attenuation region is positioned above the effective shutter region.

19. The liquid crystal shutter glasses according to claim 18, wherein the light attenuation region is not controllable of the transmission or shielding of incident light.

* * * * *